(12) United States Patent
Jalloul et al.

(10) Patent No.: US 8,130,682 B2
(45) Date of Patent: Mar. 6, 2012

(54) ASSIGNING MOBILE USERS IN A HALF-FREQUENCY DIVISION DUPLEX (HFDD) SYSTEM TO UPLINK (UL) SUB-FRAMES AND TO DOWNLINK (DL) SUB-FRAMES

(75) Inventors: Louay Jalloul, Santa Clara, CA (US); Harold Artes, Ottensheim (AT); Anuj Puri, Hercules, CA (US)

(73) Assignee: Broadcom Corporation, Irvine, CA (US)

( * ) Notice: Subject to any disclaimer, the term of this patent is extended or adjusted under 35 U.S.C. 154(b) by 7 days.

(21) Appl. No.: 12/378,604

(22) Filed: Feb. 18, 2009

(65) Prior Publication Data

US 2009/0207762 A1    Aug. 20, 2009

(51) Int. Cl.
*H04J 1/00* (2006.01)
(52) U.S. Cl. .......... 370/281; 370/329
(58) Field of Classification Search .......... 370/281, 370/277, 329; 375/316
See application file for complete search history.

(56) References Cited

U.S. PATENT DOCUMENTS

| | | | |
|---|---|---|---|
| 2005/0060094 A1* | 3/2005 | Lee et al. | 701/214 |
| 2005/0105647 A1* | 5/2005 | Wilhelmsson et al. | 375/316 |
| 2006/0291430 A1 | 12/2006 | Putzolu et al. | |
| 2007/0140167 A1* | 6/2007 | Jang et al. | 370/329 |
| 2007/0248045 A1* | 10/2007 | Nagaraj | 370/329 |
| 2008/0186881 A1 | 8/2008 | Ahl et al. | |
| 2009/0092066 A1* | 4/2009 | Chindapol et al. | 370/277 |
| 2009/0092067 A1* | 4/2009 | Sudarshan et al. | 370/281 |

* cited by examiner

*Primary Examiner* — Albert T Chou
(74) *Attorney, Agent, or Firm* — Sterne, Kessler, Goldstein & Fox P.L.L.C.

(57) ABSTRACT

Methods assigning mobile users in a half-frequency division duplex (HFDD) system to a first UL group and second UL group of an uplink (UL) sub-frame, and to a first DL group and a second DL group of a downlink (DL) sub-frame, wherein the UL sub-frame is assigned a first carrier frequency and the DL sub-frame is assigned a second carrier frequency, are disclosed. One method includes determining a type of data, determining a receive CINR (carrier interference plus noise ratio), and determining a Doppler frequency parameter, for each mobile user of a plurality of mobile users. The plurality of mobile users to are assigned to the first UL group, the second UL group, the first DL group and the second DL group based on time durations of the first UL group, the second UL group, the first DL group and the second DL group, and based on and at least one of the data type, CINR, Doppler frequency spread of the mobile user, and a number of mobile users previously assigned to the first UL group, the second UL group, the first DL group and the second DL group.

20 Claims, 5 Drawing Sheets

ASSIGNING MOBILE USERS IN A HALF-FREQUENCY DIVISION DUPLEX (HFDD) SYSTEM TO UPLINK (UL) SUB-FRAMES AND TO DOWNLINK (DL) SUB-FRAMES

FIELD OF THE DESCRIBED EMBODIMENTS

The invention relates generally to wireless communications. More particularly, the invention relates to assigning mobile users in a half-frequency division duplex (HFDD) system to uplink (UL) sub-frames and to downlink (DL) sub-frames.

BACKGROUND

Frequency Division Duplex (FDD) and Time Division Duplex (TDD) are two prevalent duplexing schemes used in wireless networks. FDD, which historically has been used in voice-only applications, supports two-way radio communication by using two distinct radio channels. Alternatively, TDD uses a single frequency to transmit signals in both the downstream and upstream directions.

For FDD systems, one frequency channel is transmitted downstream from a radio A to radio B. A second frequency is used in the upstream direction and supports transmission from radio B to radio A. Because of the pairing of frequencies, simultaneous transmission in both directions is possible. To mitigate self-interference between upstream and downstream transmissions, a minimum amount of frequency separation can be maintained between the frequency pair.

For TDD systems, a single carrier frequency channel is used to transmit signals in both the downstream and upstream directions.

Half Frequency Division Duplex (HFDD) provides a duplexing scheme in which a downstream user receives signals on one carrier frequency over a first period of time, and transmits signals on another carrier frequency over a second period of time.

It is desirable to have a TDD system implementation that is operable as an HFDD system.

SUMMARY

An embodiment includes a method of assigning mobile users in a half-frequency division duplex (HFDD) system to a first UL group and second UL group of an uplink (UL) sub-frame, and to a first DL group and a second DL group of a downlink (DL) sub-frame. This embodiment further includes the UL sub-frame being assigned a first carrier frequency and the DL sub-frame being assigned a second carrier frequency. The method includes determining a type of data, determining a receive CINR (carrier interference plus noise ratio) of the mobile user, and determining a Doppler frequency parameter, for each mobile user of a plurality of mobile users. The plurality of mobile users to are assigned to the first UL group, the second UL group, the first DL group and the second DL group based on time durations of the first UL group, the second UL group, the first DL group and the second DL group, and based on and at least one of the data type, CINR, Doppler frequency spread of the mobile user, and a number of mobile users previously assigned to the first UL group, the second UL group, the first DL group and the second DL group.

Other aspects and advantages of the present invention will become apparent from the following detailed description, taken in conjunction with the accompanying drawings, illustrating by way of example the principles of the invention.

DETAILED DESCRIPTION

Methods and apparatuses for assigning mobile users in a half-frequency division duplex (HFDD) system to uplink (UL) sub-frames and to downlink (DL) sub-frames are disclosed. Embodiments of the methods generally include assigning each of the mobile users to groups based on a type of data, a receive CINR (carrier interference plus noise ratio), and/or a Doppler frequency parameter of the mobile user. The different groups include downlink (DL) and uplink (UL) sub-frames that are of different time durations.

Figure 1:
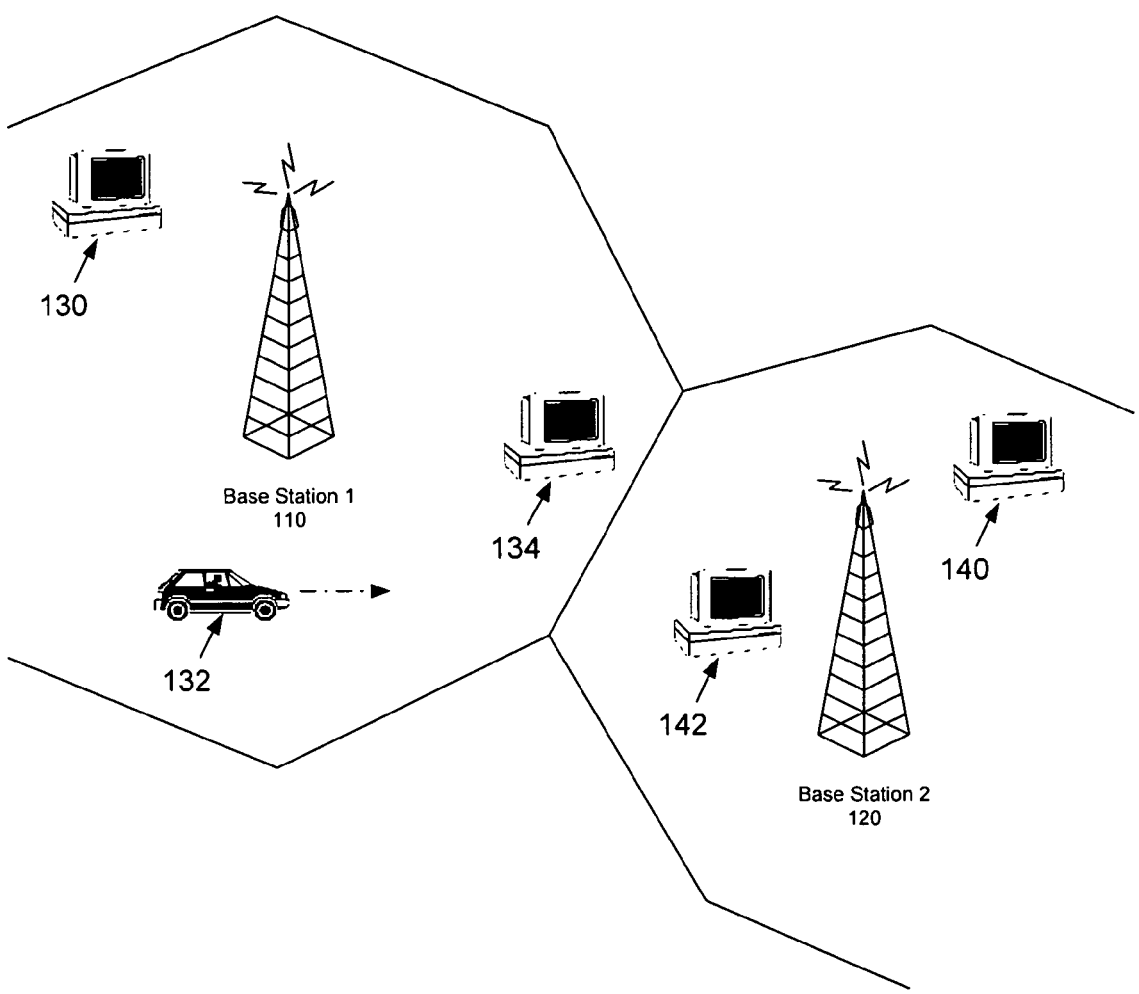
FIG. 1 shows an example of a cellular network.

FIG. 1 shows an example of a cellular network. This exemplary network includes base stations 110, 120 wirelessly communicating with mobile users 130, 132, 134, 140, 142. The cellular network can be, for example, an FDD (or HFDD) network in which downstream traffic from a base station to a mobile user can be allocated to one frequency channel, and upstream traffic from the mobile user to the base station can be allocated to another frequency channel. However, as will be described, sub-frames of the UL channel and the DL channel of different allocated groups can include different time durations. The time durations of the UL and DL of the different groups can influence how the mobile users are assigned to the different groups for UL and DL communication.

As shown, the mobile users can be fixed (such as, users 130, 134, 140, 142) or the users can be in motion (such as, user 132). As will be described, the mobile user in motion has a different Doppler parameter (such as, maximum Doppler frequency or Doppler frequency spread) than a mobile user that is fixed. The Doppler parameter of the mobile user can influence the assignment of the mobile user to the one of the different groups.

The users can be located at an edge of a cell (such as user 134) or the users can be located proximate to a base station. The proximity (as well as other factors) of the mobile user to the base station, influences the CINR of signals transmitted between the base station and the mobile user. The CINR of the mobile user can influence the assignment of the mobile user to the one of the different groups.

Additionally, the type of data being utilized by the mobile user can vary. For example, the data type of the mobile user can be voice (VoIP), web-centric data or video. Depending upon the data type, and characteristics of the data (for example, primarily upstream or primarily downstream traffic), the mobile user is assigned a group accordingly.

Figure 2:
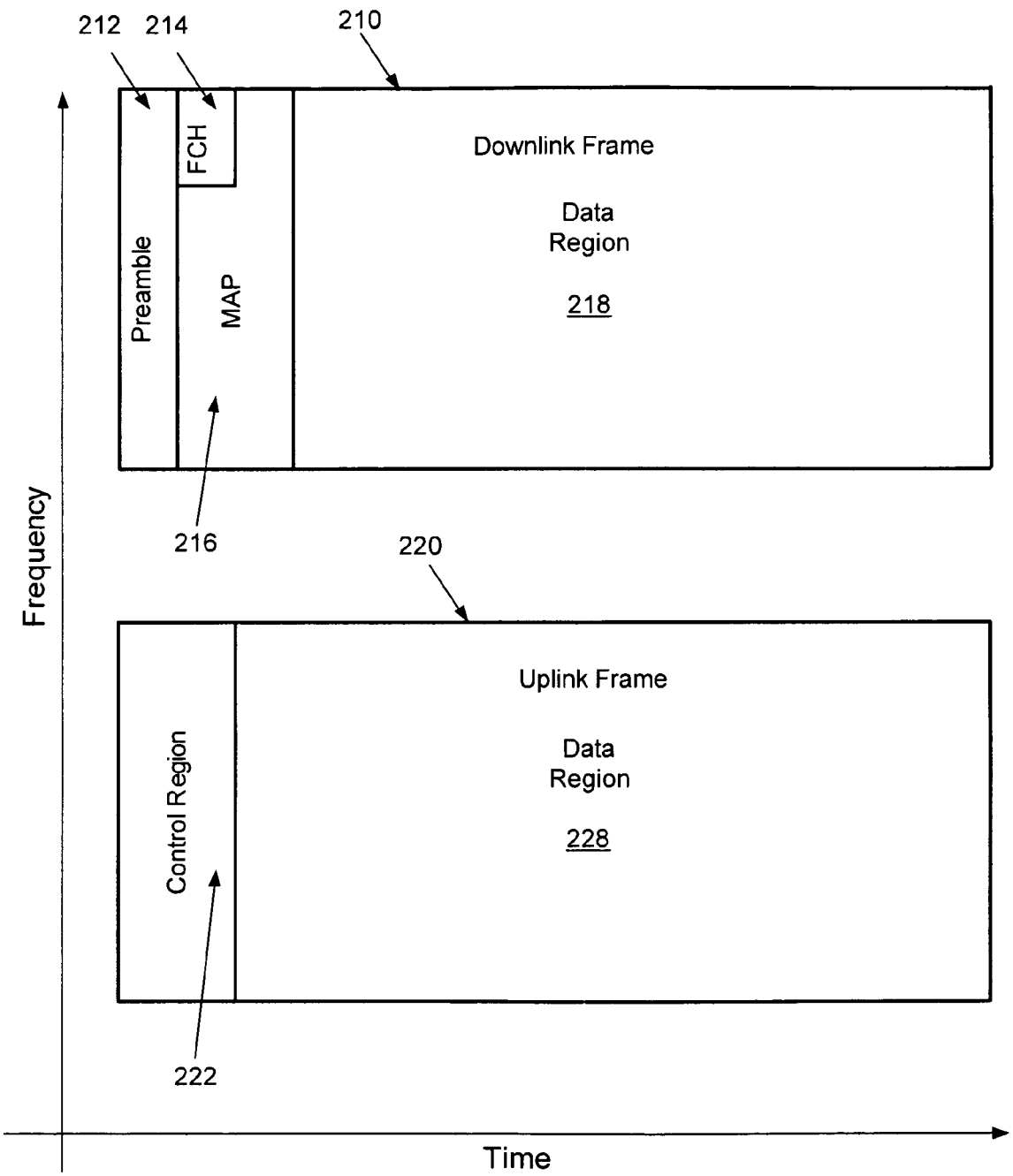
FIG. 2 shows an example of frames of frequency division duplex transmission signals.

FIG. 2 shows an example of frames of frequency division duplex transmission signals. As shown, a downlink sub-frame 218 is dedicated to downlink communications, and an uplink sub-frame 228 is dedicated to uplink communications. The downlink frame 218 occupies a different frequency channel than the uplink frame 228 as indicated by the frequency axis of FIG. 2.

As shown, the downlink frame 210 includes a preamble 212, a MAP 216, an FCH (frame control header) 214, and a data region 218. The MAP 216 operates as a pointer to the data region that defines its location, size and MCS (modulation and coding scheme).

As shown, the uplink frame 220 includes a control region 222 and a data region 228. The control region 222 provides information transmitted by the mobile user, such as, for example, ACK/NACK (Acknowledgement/Negative Acknowledgement) of downlink transmissions, CQICH (channel quality information channel, for example, CINR), and ranging that is used for timing adjustments.

Figure 3:
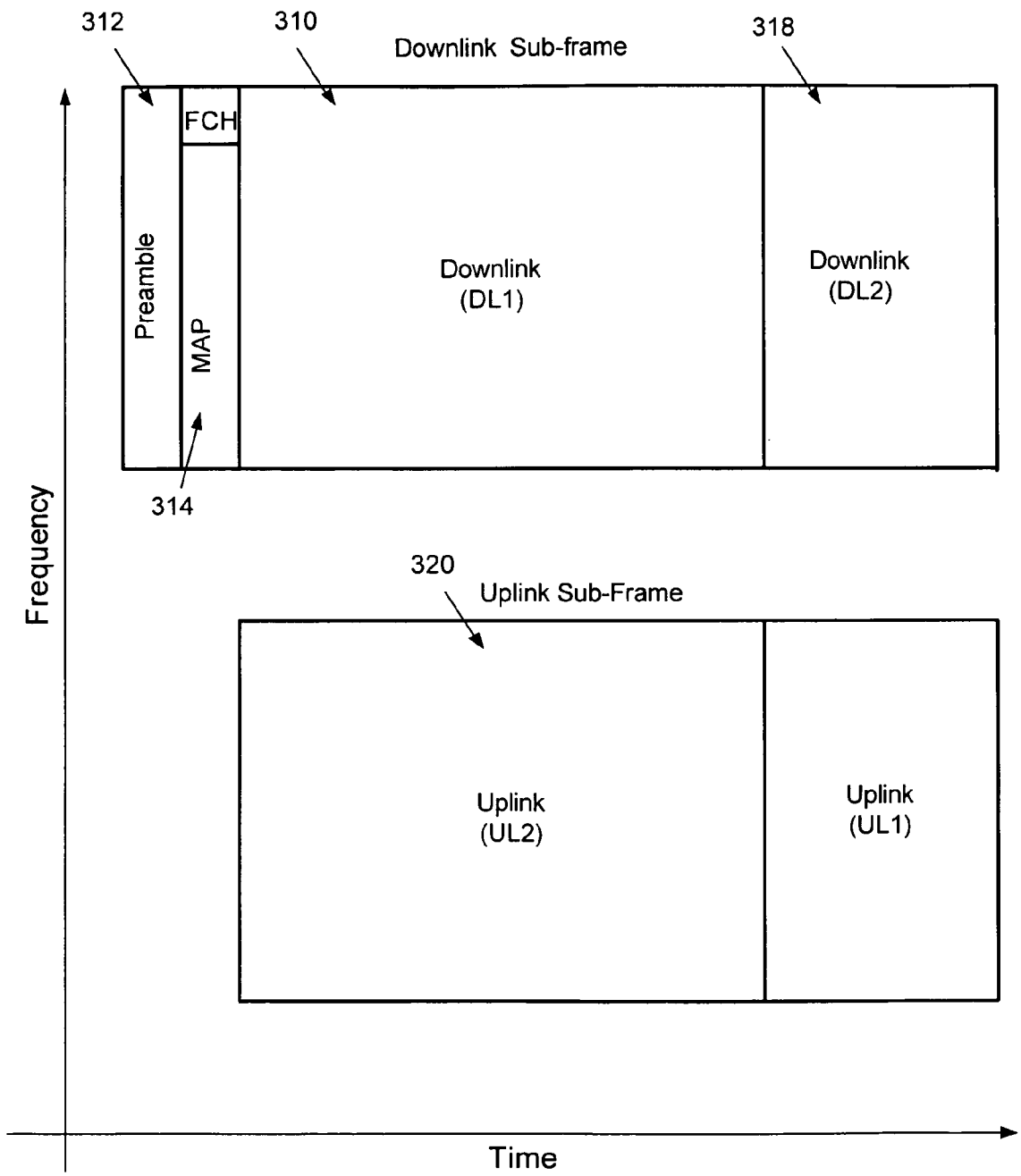
FIG. 3 shows an example of frames of half frequency division duplex (HFDD) transmission signals.

FIG. 3 shows an example of frames of half frequency division duplex (HFDD) transmission signals. The frames of the HFDD signals include characteristics of both FDD and TDD signals. A first group (Group 1) includes the downlink (DL1) sub-frame and the uplink (UL1) sub-frame. The second group (Group 2) includes the downlink (DL2) sub-frame and the uplink (UL2) sub-frame. As will be described, a useful feature of the sub-frames as shown and described is that the time duration of the uplink and downlink sub-frames of each group have different time durations. This feature is advantageously used for assigning different mobile users associated with a base station to the groups (Group1, Group2).

As shown, the downlink frame (that includes the DL1 sub-frame and the DL2 sub-frame) additionally includes a preamble 312, FCH and a MAP 314. These features can additionally be considered when assigning mobile users to the groups.

As can be observed, the embodiment of the UL and DL frames of FIG. 3 include DL1 sub-frame and the UL1 sub-frame of the first group are orthogonal in time. Additionally, the DL2 sub-frame and the UL2 sub-frame of the second group are orthogonal in time.

It can also be observed that the time durations of DL1 sub-frame and the UL1 sub-frame of the first group are different, and the time durations of the DL2 sub-frame and the UL2 sub-frame of the second group are different. However, the time duration of the downlink frame that includes the DL1 sub-frame and the DL2 sub-frame is approximately the same as the time duration of the uplink frame that includes the UL1 sub-frame and the UL2 sub-frame.

Figure 4:
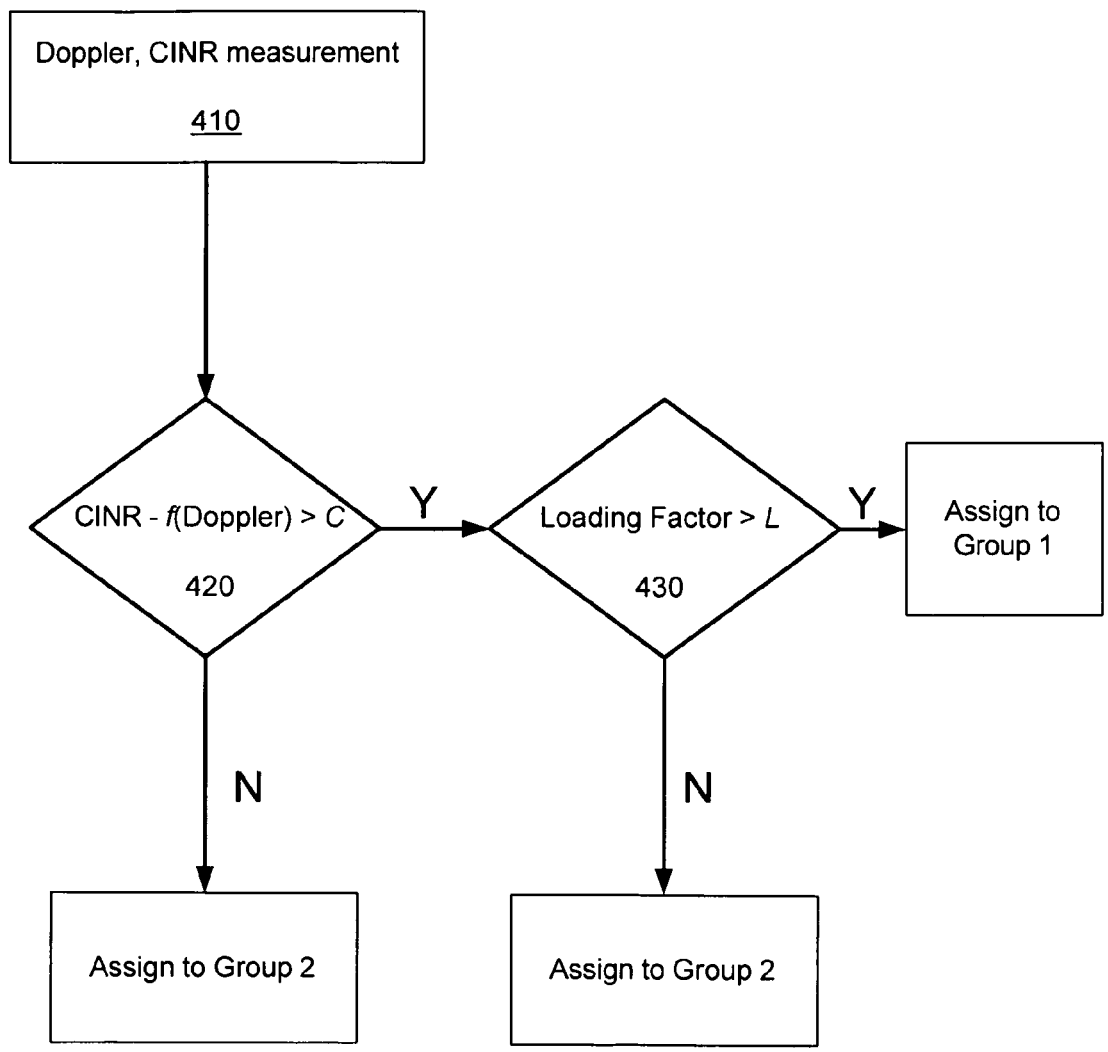
FIG. 4 is a flow chart that includes steps of a method of assigning mobile users to a first group or a second group of downlink and uplink HFDD frames.

FIG. 4 is a flow chart that includes steps of a method of assigning mobile users to a first group or a second group of downlink and uplink HFDD frames. A first step 410 includes making Doppler and CINR measurements of signals received by a mobile user. A second step 420 includes comparing the CINR measurement with a function of the Doppler measurement (f/(Doppler)) and comparing a difference with a predetermined threshold C. If the difference is less than the threshold C, then the mobile user is assigned to the second group—the group that is located the farthest away from the preamble. If the difference is greater than the threshold C, then the measurements of the mobile user are additionally processed. The f(Doppler) is a correction term (fudge factor) to augment the CINR measurement.

A third step 430 includes determining a loading factor of the base station. If the loading factor is less than a threshold L, then the mobile user is assigned to the second group. If the loading factor is greater than the threshold L, then the mobile user is assigned to the first group. The loading factor defines the number of active mobile users connected to a particular base station that have data for transmission.

Figure 5:
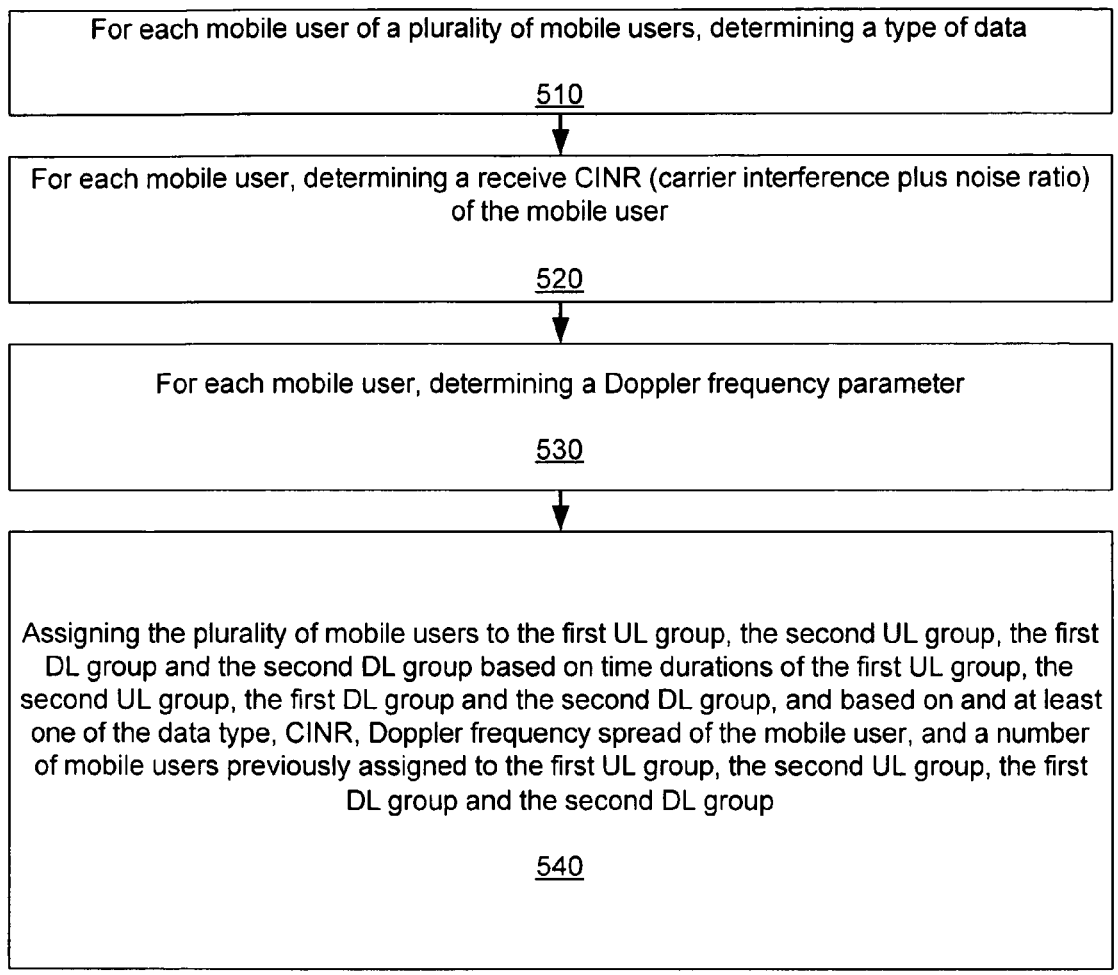
FIG. 5 is a flow chart that includes steps of a method of assigning mobile users in a half-frequency division duplex (HFDD) system to a first UL group and second UL group of an uplink (UL) sub-frame, and to a first DL group and a second DL group of a downlink (DL) sub-frame.

FIG. 5 is a flow chart that includes steps of a method of assigning mobile users in a half-frequency division duplex (HFDD) system to a first UL group and second UL group of an uplink (UL) sub-frame, and to a first DL group and a second DL group of a downlink (DL) sub-frame. For this embodiment, the UL sub-frame is assigned a first carrier frequency and the DL sub-frame is assigned a second carrier frequency, the method comprising. A first step 510 includes for each mobile user of a plurality of mobile users, determining a type of data. A second step 520 includes for each mobile user, determining a receive CINR (carrier interference plus noise ratio) of the mobile user. A third step 530 includes for each mobile user, determining a Doppler frequency parameter. A fourth step 540 includes assigning the plurality of mobile users to the first UL group, the second UL group, the first DL group and the second DL group based on time durations of the first UL group, the second UL group, the first DL group and the second DL group, and based on and at least one of the data type, CINR, Doppler frequency spread of the mobile user, and a number of mobile users previously assigned to the first UL group, the second UL group, the first DL group and the second DL group.

The Doppler frequency parameter provides an indication of movement of a mobile user with respect to a base station. Doppler frequency parameters that can be measured include, for example, a maximum Doppler frequency and a Doppler frequency spread.

The maximum Doppler frequency indicates a speed of the mobile user or a rate of changes in the received signal across multiple OFDM symbols. The Doppler frequency spread indicates the rate of change in the received signal across a single OFDM symbol period. The Doppler frequency and/or the Doppler frequency spread can be determined by the mobile user using the received downlink preambles transmitted from the base station. The Doppler frequency and/or the Doppler frequency spread can be determined by the base station using received uplink pilot tones transmitted from the mobile unit.

An embodiment includes the time duration of the first UL group of the UL sub-frame being different than the time duration of the first DL group of a corresponding DL sub-frame. This embodiment also includes the time duration of the second UL group of the UL sub-frame being different than the time duration of the second DL group of a corresponding DL sub-frame.

An embodiment includes multiple mobile users being assigned to either a first group or a second group, wherein the first group includes the first UL group and the first DL group, and the second group includes the second UL group and the second DL group. As described, the assignments are based on measurements of communication signals at the mobile users.

An embodiment includes mobile users having a downlink CINR below a downlink threshold being assigned to a one of the first group and the second group corresponding to a longer time duration of the first DL group and the second DL group.

Another embodiment includes mobile users having an uplink CINR below an uplink threshold are assigned to a one of the first group and the second group corresponding to a longer time duration of the first UL group and the second UL group.

An embodiment includes the mobile users having a greater downlink information bit rate requirement than an uplink information bit rate requirement are assigned to a one of the first group and the second group corresponding to a longer time duration of the first DL group and the second DL group.

The longer duration DL allows for greater down link information bit rates. As described, the DL and UL of each group are asymmetric. Generally, the downlink information bit requirement of each mobile user is dependent upon an application of the mobile user, and therefore, the application being used by the mobile user can be used to influence the group assignment of each mobile user.

For an embodiment, the mobile users determined to be communicating through voice over internet protocol (VoIP) on an uplink are assigned to a one of the first group and the second group corresponding to a longer time duration of the first UL group and the second UL group.

For an embodiment, the mobile users determined to be communicating through voice over interne protocol (VoIP) on an uplink below a threshold, are assigned to a one of the first group and the second group corresponding to a longer time duration of the first DL group and the second DL group. That is, for example, while a mobile user is operating a voice connection, the group assignment of the mobile user can adjust or adapt to the mobile user transmitting voice data through the uplink (talking), and then the group assignments can adjust or adapt to when the mobile user is receiving voice data through the downlink (listening).

An embodiment includes a first symbol of the DL sub-frame including a preamble. As previously described, the preamble is a set of known tones. This embodiment can further include assigning mobile users having a Doppler measured above a threshold being assigned to a one of the first group and the second group that includes a preamble.

An embodiment includes the base stations performing the mobile user assignments. Embodiments include the base station informing the mobile users of the group assignments. Embodiments can also include the mobile users assisting the base station.

Each mobile user carries over state information when switching between the first group and the second group. A non-exhaustive list of examples of the state information includes a connection ID, ARQ state, and HARQ state. The state information can be carried over between groups by, for example, the base station informing the mobile user of the state information.

Although specific embodiments have been described and illustrated, the described embodiments are not to be limited to the specific forms or arrangements of parts so described and illustrated. The described embodiments are limited only by the appended claims.

What is claimed:

1. A method of assigning mobile users in a half-frequency division duplex (HFDD) system to a first UL group and a second UL group of an uplink (UL) sub-frame, and to a first DL group and a second DL group of a downlink (DL) sub-frame, the UL sub-frame being assigned a first carrier frequency and the DL sub-frame being assigned a second carrier frequency, the method comprising:
   for each mobile user of a plurality of mobile users, determining a type of data;
   for each mobile user, determining a receive CINR (carrier interference plus noise ratio) of the mobile user;
   for each mobile user, determining a Doppler frequency parameter;
   assigning the plurality of mobile users to the first UL group, the second UL group, the first DL group and the second DL group based on time durations of the first UL group, the second UL group, the first DL group and the second DL group, and based on at least one of the CINR, Doppler frequency spread of the mobile user, and a number of mobile users previously assigned to the first UL group, the second UL group, the first DL group and the second DL group.

2. The method of claim 1, wherein the Doppler frequency parameter comprises at least one of a maximum Doppler frequency and a Doppler frequency spread.

3. The method of claim 1, wherein first UL group of the UL sub-frame and the first DL group of the DL sub-frame are orthogonal in time, and the second UL group of the UL sub-frame and second DL group of the DL sub-frame are orthogonal in time.

4. The method of claim 3, further comprising a time duration of the first UL group of the UL sub-frame being different than a time duration of the first DL group of a corresponding DL sub-frame.

5. The method of claim 3, further comprising a time duration of the second UL group of the UL sub-frame being different than a time duration of the second DL group of a corresponding DL sub-frame.

6. The method of claim 4, wherein multiple mobile users are assigned to either a first group or a second group, wherein the first group includes the first UL group and the first DL group, and the second group includes the second UL group and the second DL group.

7. The method of claim 6, wherein mobile users having a downlink CINR below a downlink threshold are assigned to a one of the first group and the second group corresponding to a longer time duration of the first DL group and the second DL group.

8. The method of claim 6, wherein mobile users having an uplink CINR below an uplink threshold are assigned to a one of the first group and the second group corresponding to a longer time duration of the first UL group and the second UL group.

9. The method of claim 6, wherein the mobile users having a greater downlink information bit rate requirement than an uplink information bit rate requirement are assigned to a one of the first group and the second group corresponding to a longer time duration of the first DL group and the second DL group.

10. The method of claim 9, wherein the downlink information bit requirement of each mobile user is dependent upon an application of the mobile user.

11. The method of claim 6, wherein the mobile users, determined to be communicating through voice over internet protocol (VoIP) on an uplink, are assigned to a one of the first group and the second group corresponding to a longer time duration of the first UL group and the second UL group.

12. The method of claim 6, wherein the mobile users, determined to be communicating through voice over internet protocol (VoIP) on an uplink below a threshold, are assigned to a one of the first group and the second group corresponding to a longer time duration of the first DL group and the second DL group.

13. The method of claim 6, the DL sub-frame comprises a first symbol that includes a preamble.

14. The method of claim 1, further comprising assigning mobile users having a Doppler parameter measured above a threshold to one of the first group and the second group that includes a preamble.

15. The method of claim 1, further comprising a base station performing the mobile user assignments, wherein the mobile users assist the base station.

16. The method of claim 15, further comprising the base station informing the mobile users of the group assignments.

17. The method of claim 16, further comprising each mobile user carrying over state information when switching between the first group and the second group, wherein the state information comprises at least one of a connection ID, ARQ state, and HARQ state.

18. The method of claim 17, wherein carrying over the state information comprises the base station informing the mobile user of the state information.

19. A method of assigning a mobile user in a half-frequency division duplex (HFDD) system to one of a first UL group or a second UL group of an uplink (UL) sub-frame, or to a first DL group or a second DL group of a downlink (DL) sub-frame, the UL sub-frame being assigned a first carrier frequency and the DL sub-frame being assigned a second carrier frequency, the method comprising:
- determining a receive CINR (carrier interference plus noise ratio) of the mobile user;
- determining a Doppler frequency spread of the mobile user;
- determining a time duration of each of the first UL group, the second UL group, the first DL group and the second DL group;
- determining a number of mobile users assigned to each of the first UL group, the second UL group, the first DL group and the second DL group; and
- assigning the mobile user to one of the first UL group, the second UL group, the first DL group or the second DL group based on at least one of the determined CINR, Doppler frequency spread, time durations, and numbers of assigned mobile users.

20. The method of claim 19, the downlink sub-frame including a preamble, the method further comprising:
- comparing the determined Doppler frequency spread to a threshold value;
- determining which of the first DL group or the second DL group is furthest from the preamble; and
- if the determined Doppler frequency spread is below the threshold value, assigning the mobile user to the group determined to be located furthest from the preamble.

* * * * *